United States Patent
Chen

(12) 
(10) Patent No.: US 6,293,062 B1
(45) Date of Patent: Sep. 25, 2001

(54) INCOMBUSTIBLE FIREPROOF NETWORK ELEVATED FLOORBOARD

(76) Inventor: Yao-Chung Chen, 7F, No. 214, Sec. 3, Ta-Tung Rd., Hsi-Chien City, Taipei Hsien (TW)

( * ) Notice: Subject to any disclaimer, the term of this patent is extended or adjusted under 35 U.S.C. 154(b) by 0 days.

(21) Appl. No.: 09/450,429

(22) Filed: Nov. 30, 1999

(51) Int. Cl.[7] .................................................. E04C 2/52
(52) U.S. Cl. ...................... 52/220.1; 52/126.5; 52/220.2; 52/220.3; 52/263
(58) Field of Search ................ 52/126.5, 220.1, 52/220.2, 220.3, 263

(56) References Cited

U.S. PATENT DOCUMENTS

| | | | |
|---|---|---|---|
| 5,052,157 | * 10/1991 | Ducroux et al. ............... | 52/263 X |
| 5,090,169 | * 2/1992 | Takeda et al. ................. | 52/220.3 |
| 5,434,355 | * 7/1995 | Sho ................................. | 52/220.3 X |
| 5,459,968 | * 10/1995 | Jin ................................... | 52/220.2 X |
| 5,628,157 | * 5/1997 | Chen .............................. | 52/220.2 X |
| 5,630,300 | * 5/1997 | Chen .............................. | 52/220.1 X |
| 5,673,522 | * 10/1997 | Schilham ....................... | 52/220.3 X |
| 5,675,950 | * 10/1997 | Shilham ......................... | 52/220.3 X |
| 5,848,506 | * 12/1998 | Kobayashi et al. ............ | 52/220.2 |
| 5,904,015 | * 5/1999 | Chen .............................. | 52/220.2 |

* cited by examiner

*Primary Examiner*—Carl D. Friedman
*Assistant Examiner*—Chi Nguyen
(74) *Attorney, Agent, or Firm*—Bacon & Thomas

(57) ABSTRACT

An incombustible fireproof network elevated floorboard in which the flanges of the cover boards are fitted into multiple grooves of the leg supports of the floorboard. In addition, the cover boards are partially locked with the leg supports by screws. The floorboard is made of metallic material and achieves enhanced fireproof effect to meet the strict requirement for incombustibility of skyscraper building. In addition, the present invention can be easily and quickly manufactured and assembled. The cover boards can be assembled with the leg support by various angles.

9 Claims, 6 Drawing Sheets

INCOMBUSTIBLE FIREPROOF NETWORK ELEVATED FLOORBOARD

BACKGROUND OF THE INVENTION

The present invention relates to an incombustible fireproof network elevated floorboard in which the top face of each leg support is formed with multiple grooves and a thread hole and the fitting pad is fitted on the upper side of each leg support. Then by means of the multiple grooves and thread hole of the top face of the leg support, the base seat cover board can be assembled with leg support in a factory. In working site, the central cover board and the side cover board are quickly assembled with the base seat cover board and the respective leg supports. Therefore, floorboard can be easily and quickly assembled and provide a firm connecting effect and meet the requirement for fireproof regulation of buildings. The floorboard is applicable to various kinds of offices, residences, studios, stores or the like.

FIG. 1 shows a commercially available elevated floorboard structure, described in U.S. Pat. No. 5,904,015 of the inventor, which is composed of an elevated floorboard 10, a connecting seat 11, a wire channel seat 12, a central cover body 14 and an elongated side cover body 15 which are assembled with each other. The periphery of the top face of the elevated floorboard 10 is formed with grooves 101. The peripheries of the central cover body 14 and the metallic main cover board 13 are formed with downward extending engaging flanges 141, 131. Also, the long edges of the side cover body 15 are formed with downward extending engaging flange 151 for inserting into the grooves 101. The leg sections 102 of the elevated floorboard 10 are fitted into the connecting seat 11 which is assembled with the wire channel seat 12 to form a network elevated floorboard structure with wire laying channel. The frame section 103 and leg sections 102 of the elevated floorboard 10 are integrally formed of plastic material. Such material is fireproof treated (that is, the so-called secondary fireproof) and is applicable to the general office building. However, such material still cannot meet the requirement for complete incombustibility of a skyscraper building.

SUMMARY OF THE INVENTION

It is therefore a primary object of the present invention to provide an incombustible fireproof network elevated floorboard in which the top face of each leg support is formed with multiple grooves and a central thread hole. A corresponding number of fitting pads are respectively fitted with the leg supports. Then the leg supports are assembled with the base seat cover board in a factory. In working site, the flanges of the central cover board and the multiple fixing plates of the side cover board are quickly assembled with the base seat cover board and the respective leg supports which have been already assembled in the factory. Finally, the assembly is connected with the connecting seat. Therefore, the present invention can be easily and quickly assembled and provide a firm connecting effect.

It is a further object of the present invention to provide the above fireproof floorboard in which the metallic leg supports have better heat-resistance so that the fireproof effect of the floorboard is enhanced and the safety can be greatly increased to meet the first grade fireproof standard of buildings.

It is still a further object of the present invention to provide the above fireproof floorboard in which the top face of the leg support is formed with multiple grooves, whereby the cover boards can be assembled with the leg support by various angles to increase the changeability of assembly.

According to the above objects, the incombustible fireproof network elevated floorboard of the present invention includes a base seat cover board, a central cover board, side cover boards, leg supports, fitting pads and a connecting seat. The leg supports are independently made of metallic material with a certain length. The top face of each leg support is formed with multiple grooves and a thread hole and the fitting pad is fitted on the upper side of each leg support. By means of the multiple grooves and thread hole of the leg support, the leg supports are assembled with the base seat cover board in a factory. In working site, the flanges of the central cover board and the multiple fixing plates of the side cover board are quickly assembled with the base seat cover board and the respective leg supports which have been already assembled in the factory. The present invention can be easily and quickly assembled to achieve a firm connecting effect and meet the requirement for incombustibility of skyscraper building.

The present invention can be best understood through the following description and accompanying drawings wherein:

DETAILED DESCRIPTION OF THE PREFERRED EMBODIMENT

Figure 1:
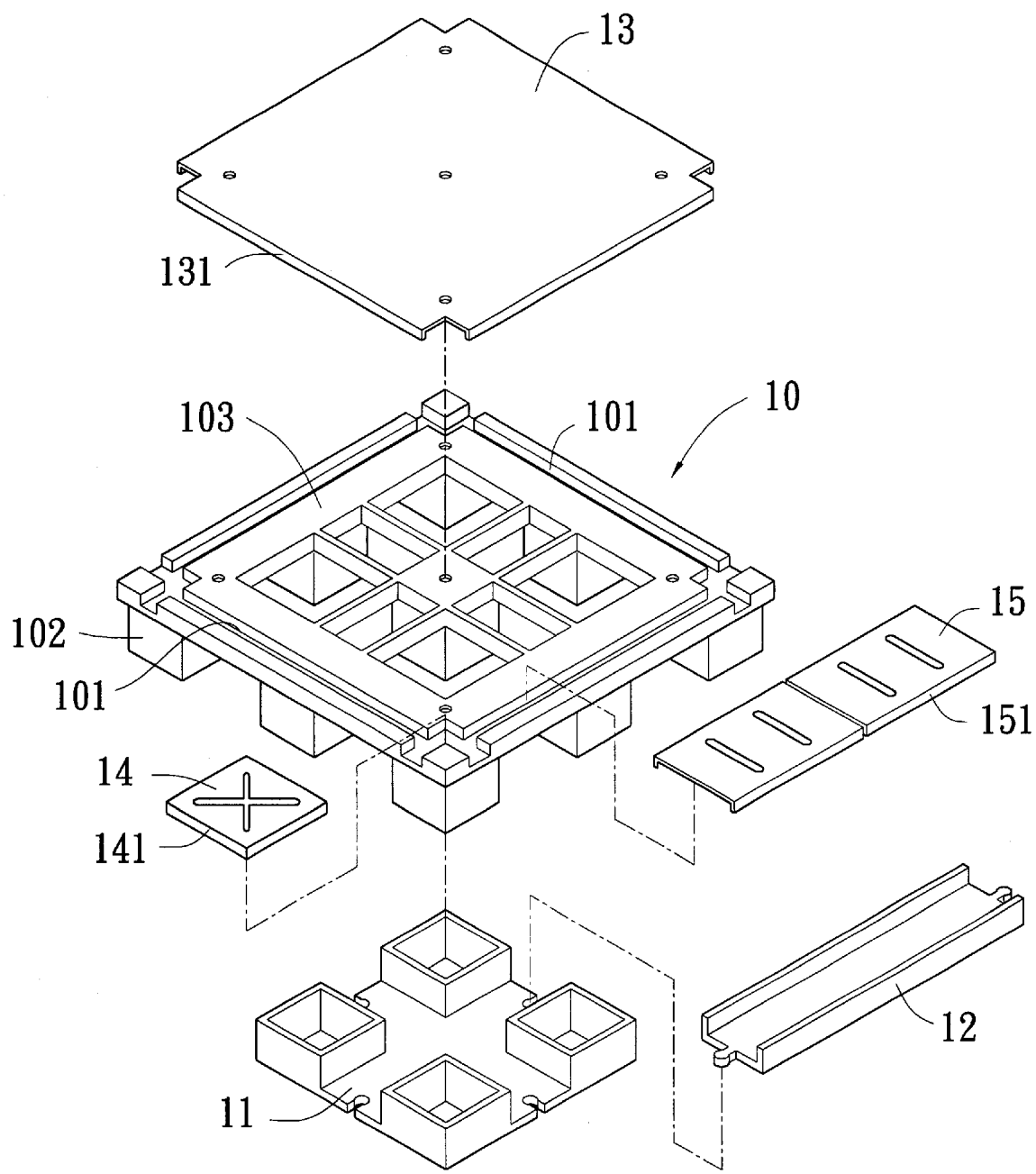
FIG. 1 is a perspective exploded view of a conventional network elevated floorboard.

Please refer to FIGS. 2 to 5. The incombustible fireproof network elevated floorboard of the present invention includes a base seat cover board 2, a central cover board 3, side cover boards 4, leg supports 5, fitting pads 6 and a connecting seat 7.

Figure 2:
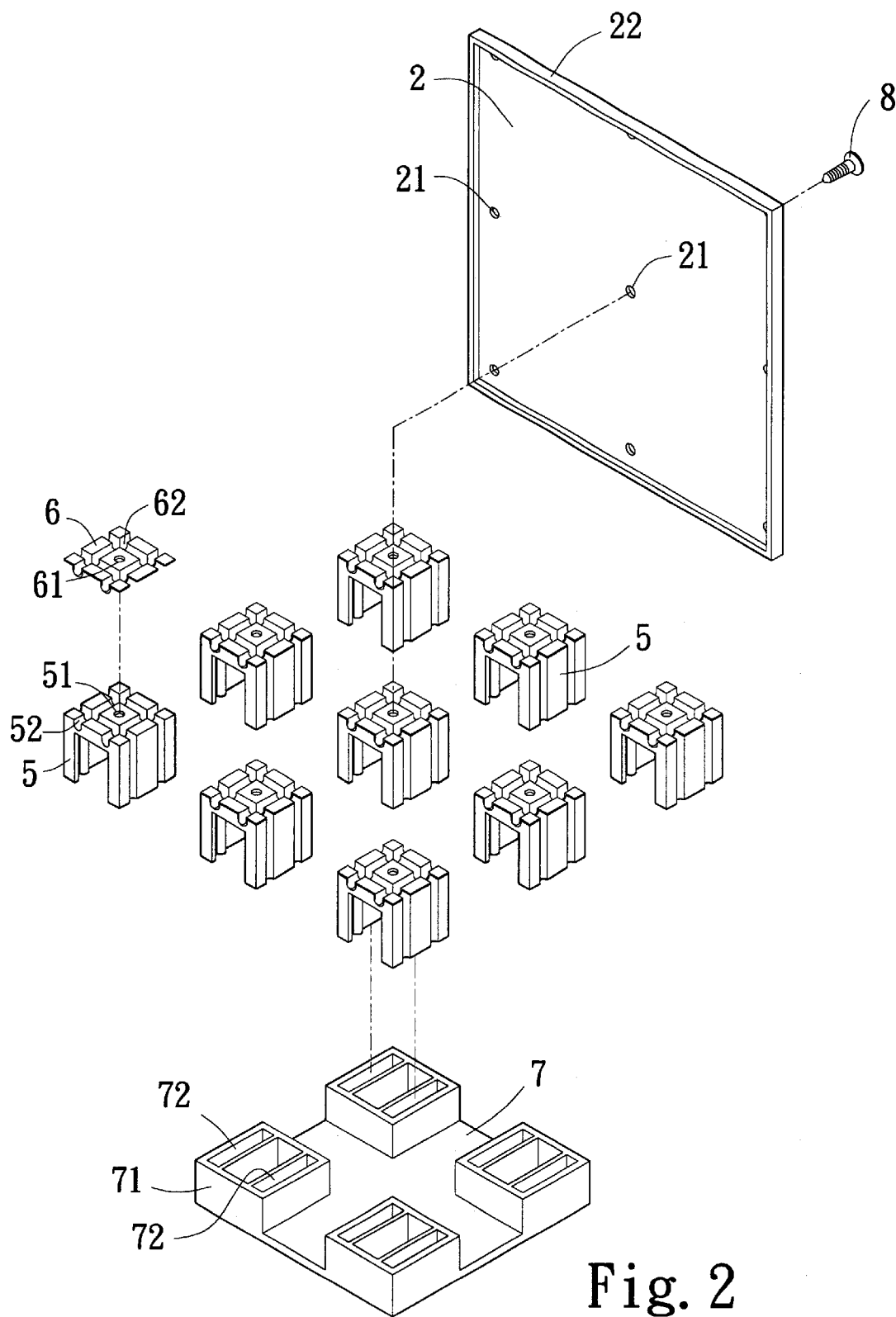
FIG. 2 is a perspective exploded view of the incombustible fireproof network elevated floorboard of the present invention.

Referring to FIG. 2, the leg support 5 is independently made and is substantially reverse U-shaped seen from a lateral side. The top section contains two pairs of parallel grooves which intersect each other grooves. Element 52 is one groove of the parallel intersecting grooves. The top section also a central thread hole 51. A corresponding fitting pad 6 is disposed on the upper side of each leg support 5. The top face of the fitting pad 6 also contains two pairs of parallel grooves which intersect each other and mate with the intersecting grooves in the top section of leg support 5. 62 is one of the intersecting grooves in the top surface of the fitting pad. The top surface of the fitting pad also contains a central through hole 61.

The periphery of the base seat cover board 2 is formed with downward extending flange 22 and several thread holes 21. Multiple screws 8 are screwed into the thread holes 21 to sequentially lock the base seat cover board 2, fitting pad 6 and leg support 5 with each other.

Figure 3:
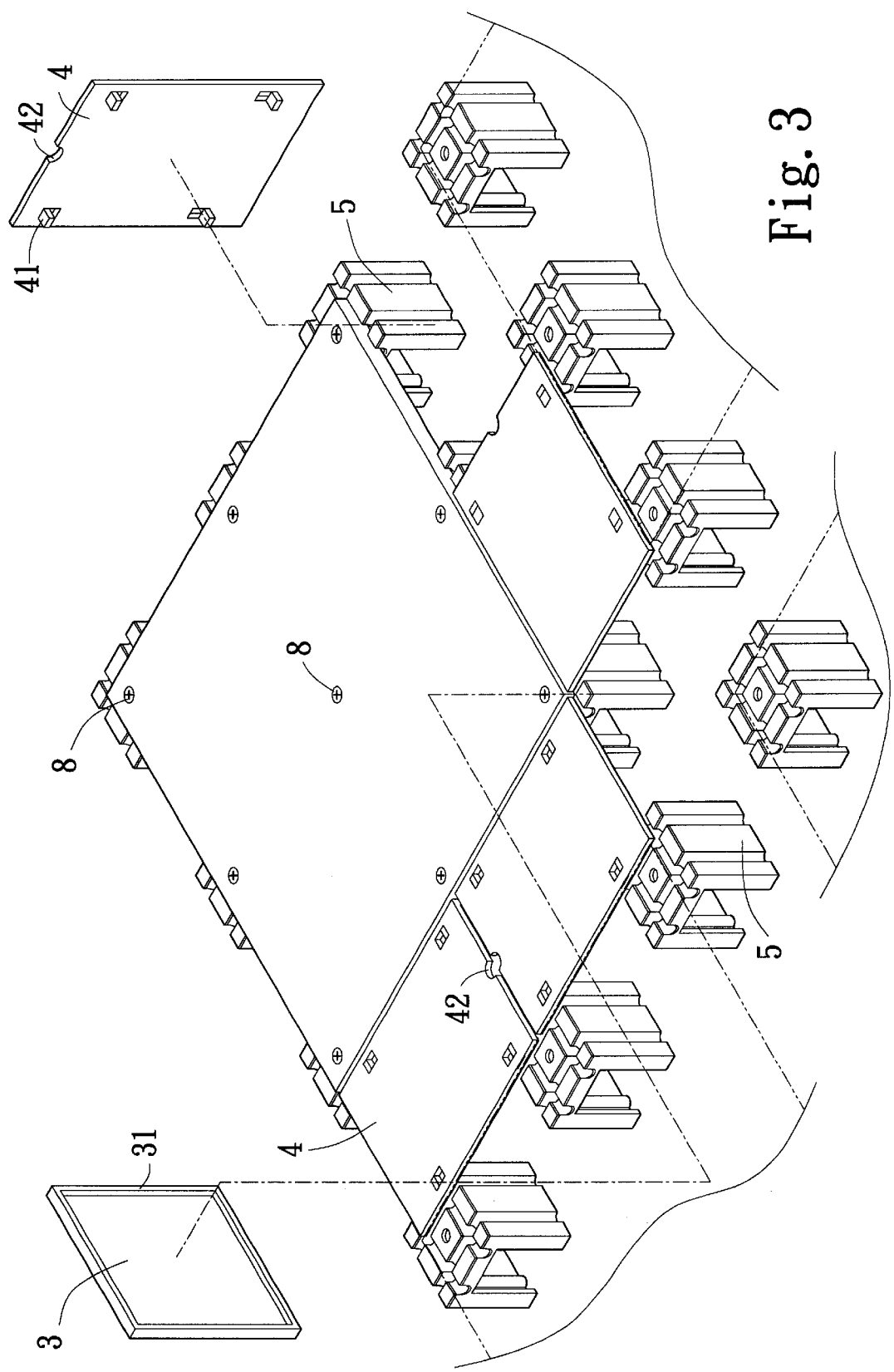
FIG. 3 is a perspective assembled view of the incombustible fireproof network elevated floorboard of the present invention.

Referring to FIG. 3, the periphery of the central cover board 3 is also formed with downward extending flange 31 for inserting into the intersecting grooves of the leg support 5. A fitting pad 6 is sandwiched between the central cover board 3 and each leg support 5.

The side cover board 4 is disposed with four downward projecting fixing plates 41. A middle of one side of the side cover board 4 is formed with a notch 42. The two fixing plates 41 approximate to the notch 42 is closer to the side on which the notch 42 is formed, while the other two fixing plates 41 is farther from the side opposite to the side on which the notch 42 is formed, whereby two side cover boards 4 can be symmetrically matched with each other.

The connecting seat 7 is a square body. The four corners of the connecting seat 7 are respectively formed with four sockets 71 facing upward. Each socket 71 is disposed with three cavities 72, whereby the leg support 5 can be fitted into the two lateral cavities 72 of the socket 71.

Figure 4:
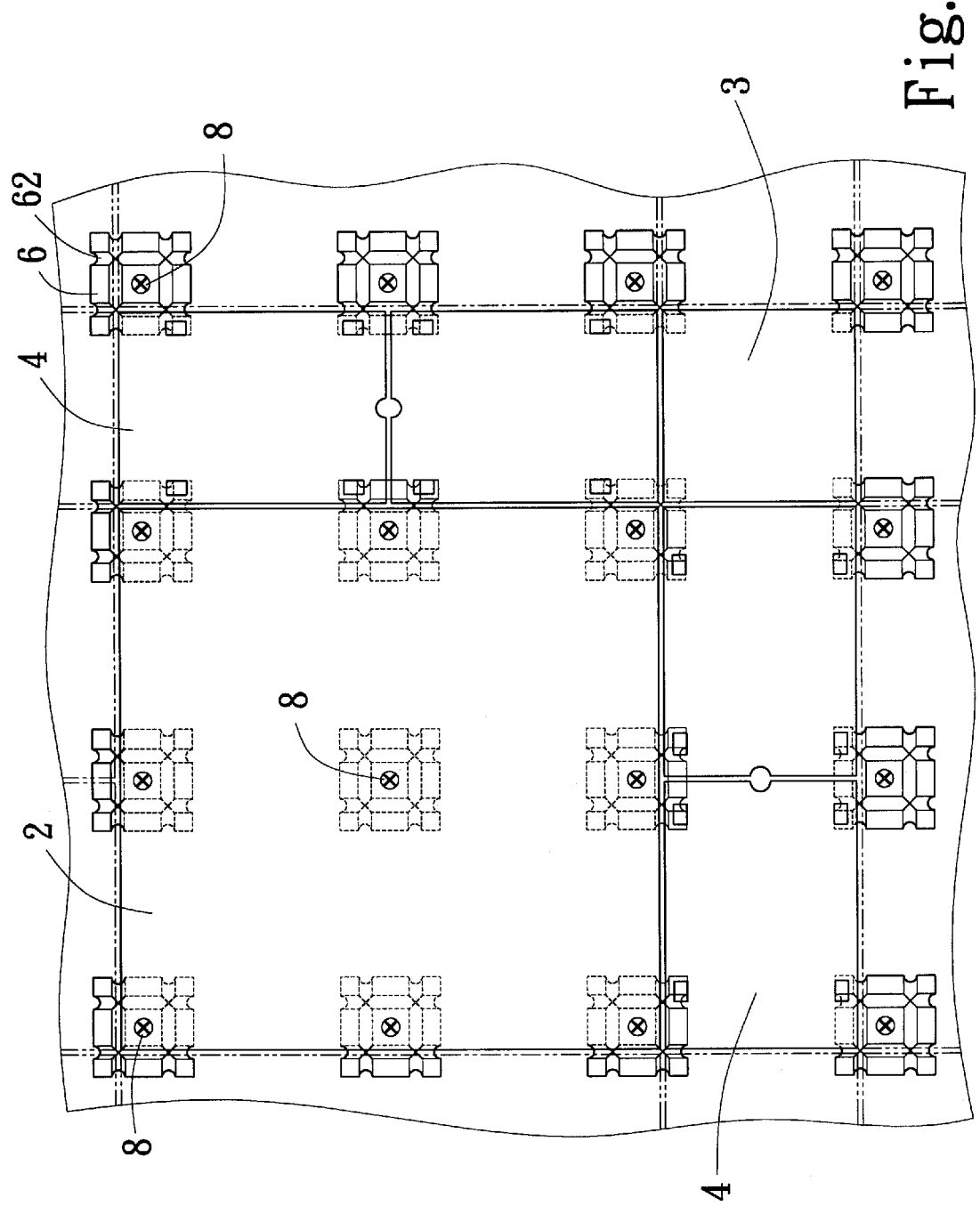
FIG. 4 is a plane assembled view of the incombustible fireproof network elevated floorboard of the present invention.
Figure 5:
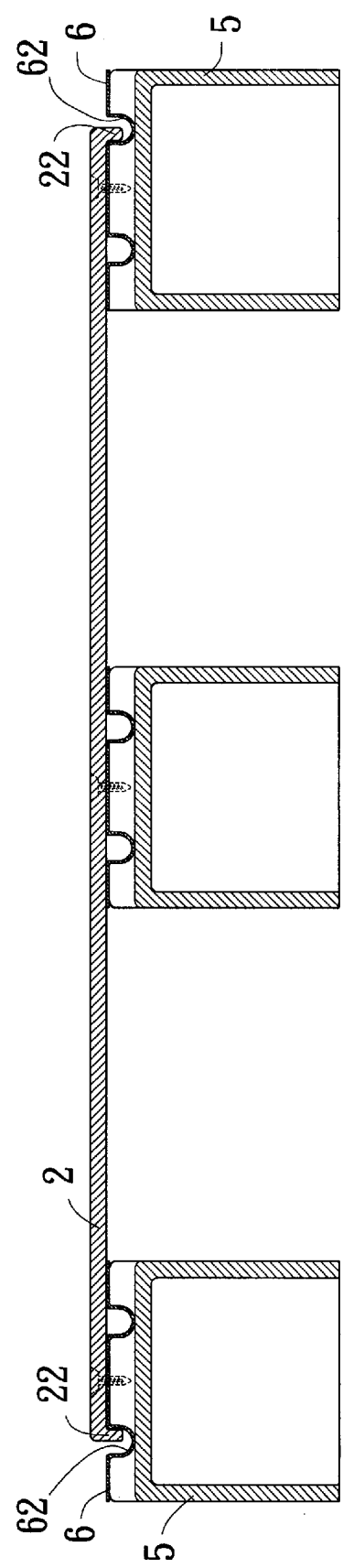
FIG. 5 is a sectional view showing the connection between the base seat cover board and the leg support of the incombustible fireproof network elevated floorboard of the present invention.

The fitting pad 6 is fitted with the upper side of each leg support 5. By means of the thread hole 51 formed at the center of the top face of the leg support 5 and the intersecting grooves, the leg support 5 can be assembled with the base seat cover board 2 in a factory. In working site, the flanges 31 of the central cover board 3 and the four fixing plates 41 of the side cover board 4 are quickly assembled with the base seat cover board 2 and the respective leg supports 5 which have been already assembled in the factory. Referring to FIGS. 2, 4 and 5, the base seat cover board 2, fitting pad 6 and leg support 5 are sequentially locked with each other by screws 8. The downward extending flanges 22 of the periphery of the base seat cover board 2 are fitted into one of the intersecting grooves 52 of the top face of the leg support 5 and the flanges 31 of the central cover board 3 are fitted into the intersecting grooves of the leg support 5. In addition, the four fixing plates 41 of the side cover board 4 are fitted into the intersecting grooves of the respective leg supports 5. Accordingly, the assembly can be easily and quickly performed and a firm connection can be achieved. By means of the intersecting grooves of the leg support, the leg support can be connected with the cover boards by various angles. In addition, the notches 42 of each two adjacent side cover boards 4 together define a through hole which facilitates the replacement of the cover board and serves as a wire exit. The metallic leg support 5 has better fireproof property so that the safety is greatly enhanced.

Figure 6:
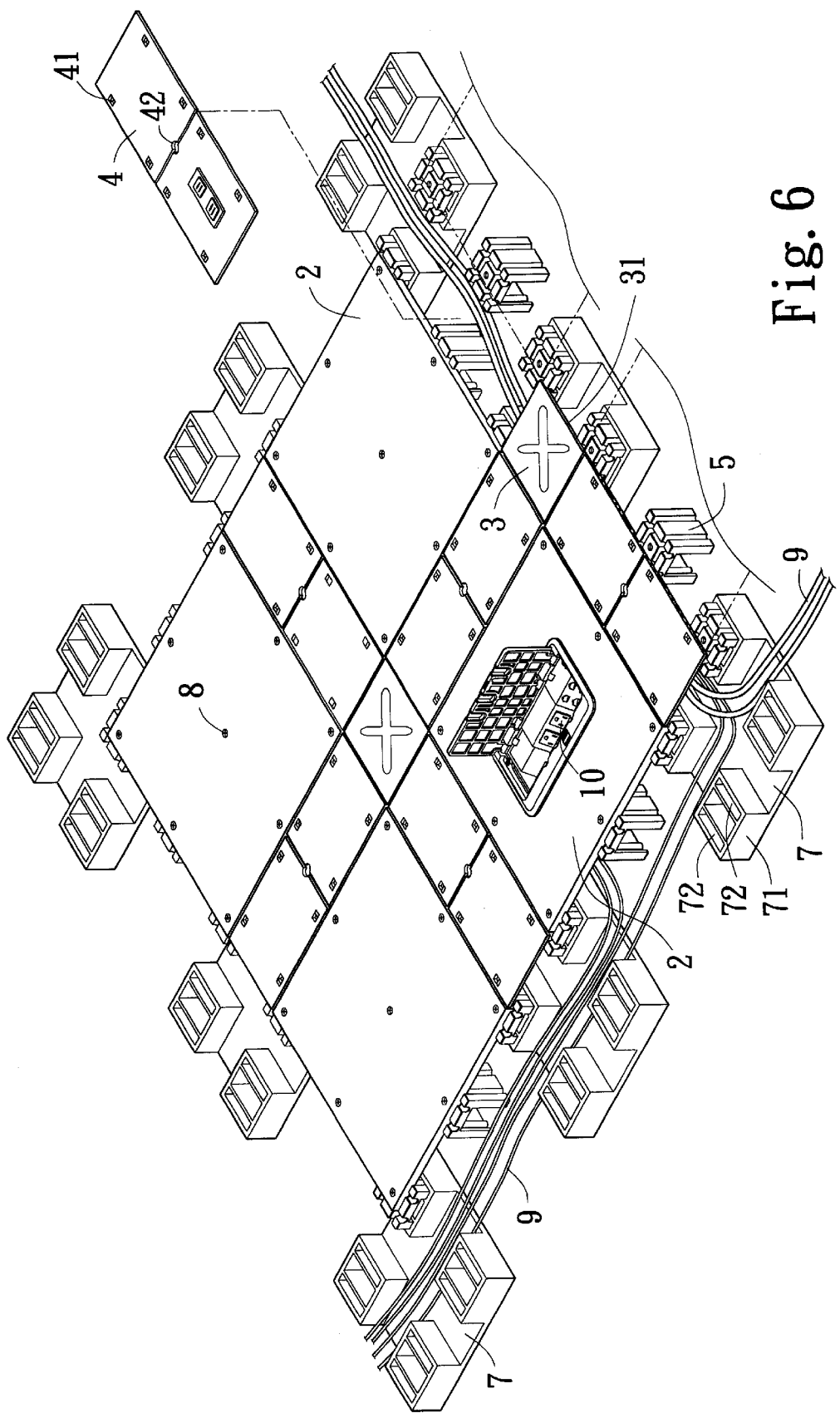
FIG. 6 is a perspective view showing the application of the incombustible fireproof network elevated floorboard of the present invention.

Referring to FIG. 6, in use, the respective leg supports 5 can be positioned at a certain height as necessary. The multiple connecting seats 7 are interconnected to define a wire laying space in which the electric wire 9 is elastically laid and connected with a socket 10 at a desired position. Therefore, the present invention can be easily and quickly assembled and provide a firm connecting effect as well as enhance the fireproof effect to meet the requirement for fire safety of skyscraper building. Moreover, the positions of the wire exits can be freely changeably arranged to enhance the practicability and safety.

Accordingly, the metallic leg supports are arranged at a certain length and the fitting pads are respectively fitted onto the upper sides of the leg supports. By means of the thread hole formed at the center of the top face of each leg support and the intersecting grooves formed on the top face of the leg support, the leg support can be assembled with the base seat cover board in a factory. In working site, the flanges of the central cover board and the four fixing plates of the side cover board are quickly assembled with the base seat cover board and the respective leg supports which have been already assembled in the factory. Therefore, the present invention can be easily and quickly assembled and provide a firm connecting effect. Moreover, the positions of the wire exits can be freely changeably arranged to enhance the practicability and safety.

According to the above arrangement, the present invention has the following advantages:

1a. After the fitting pads are respectively fitted with the leg supports, the leg support can be assembled with the base seat cover board in a factory. In working site, the flanges of the central cover board and the four fixing plates of the side cover board are quickly assembled with the base seat cover board and the respective leg supports which have been already assembled in the factory. Therefore, the present invention can be easily and quickly assembled and provide a firm connecting effect.

2a. The metallic leg supports have better heat-resistance so that the fireproof effect of the floorboard is enhanced and the safety can be greatly increased to meet the first grade fireproof standard.

3a. The top face of the leg support is formed with multiple grooves, whereby the cover boards can be assembled with the leg support by various angles.

4a. The present invention can be quickly assembled so that the working time is shortened.

5a. The leg supports and the cover boards define a wire laying space, whereby the wire exit can be freely arranged at any position.

The above embodiment is only used to illustrate the present invention, not intended to limit the scope thereof. Many modifications of the above embodiment can be made without departing from the spirit of the present invention.

What is claimed is:

1. A fireproof network elevated floorboard comprising a base seat cover board, a central cover board, side cover boards, leg supports, fitting pads and a connecting seat, said floorboard being characterized in that the leg supports are arranged at a certain height and the top face of each leg support is formed with multiple grooves and a screw-threaded hole, a fitting pad being fitted on the upper side of each leg support and likewise being formed with multiple grooves and a screw-threaded hole conforming in configuration with the top face of the corresponding leg support, the peripheries of the base seat cover board and the central cover board being formed with flanges, the periphery of the side cover board being punched with several downwardly projecting fixing plates at certain positions, the flanges and the fixing plates of the cover boards being insertable into the multiple grooves of the fitting pads on the top faces of the leg supports, the base seat cover screws being screwed into the thread holes of the base seat cover board to lock with the leg supports, the leg supports being fitted with the connecting seat.

2. A fireproof network elevated floorboard as claimed in claim 1, wherein the periphery of the base seat cover board is formed with downwardly extending flanges and multiple holes.

3. A fireproof network elevated floorboard as claimed in claim 1, wherein the periphery of the central cover board is formed with downwardly extending flanges.

4. A fireproof network elevated floorboard as claimed in claim 1, wherein the inner sides of the corners of the side cover board are disposed with downwardly projecting fixing plates, a middle of one side of the side cover board being formed with a notch, the two fixing plates approximate to the notch being closer to the side on which the notch is formed, while the other two fixing plates being further from the side opposite to the side on which the notch is formed, whereby two adjacent side cover boards can be symmetrically matched with each other and the notches of the adjacent side cover boards together define a through hole.

5. A fireproof network elevated floorboard as claimed in claim 1, wherein the base seat cover board is made of metallic material.

6. A fireproof network elevated floorboard as claimed in claim 1, wherein each leg support is made of metallic material.

7. A fireproof network elevated floorboard as claimed in claim 1, wherein the multiple grooves of the top face of the leg support comprise two pairs of parallel intercrossing grooves.

8. A fireproof network elevated floorboard as claimed in claim 1, wherein the top face of each fitting pad is formed with multiple grooves and a through hole corresponding to the grooves and the screw-threaded hole in the top face of the leg supports.

9. A fireproof network elevated floorboard as claimed in claim 1, wherein each corner of the connecting seat is formed with an upwardly facing socket, each socket being disposed with three cavities, two lateral cavities of each socket being adapted to receive a respective leg support to connect it to the connecting seat.

* * * * *